United States Patent [19]

Masters et al.

[11] 3,724,359
[45] Apr. 3, 1973

[54] BEVERAGE MAKER
[75] Inventors: Leonard Kenneth Morgan Masters, Newcastle-under-Lyme; Thomas Dalziel, Birmingham, both of England
[73] Assignee: Russell Hobbs Limited, Alperton, England
[22] Filed: May 3, 1971
[21] Appl. No.: 139,380

[30] Foreign Application Priority Data

May 6, 1970 Great Britain.....................21,752/70

[52] U.S. Cl......................................99/281, 99/319
[51] Int. Cl..............................................A47j 31/00
[58] Field of Search........99/281, 282, 283, 280, 310, 99/311, 312, 319

[56] References Cited

UNITED STATES PATENTS 3,665,841 5/1972 Hardy et al..............................99/281
1,884,070 10/1932 Mennicke..........................99/319 X

FOREIGN PATENTS OR APPLICATIONS 76,092 12/1893 Germany................................99/282

Primary Examiner—Robert W. Jenkins
Assistant Examiner—Philip R. Coe
Attorney—Merriam, Marshall, Shapiro & Klose

[57] ABSTRACT

In a beverage-maker including a vessel in which a liquid is heated, and a receptacle for a material to be infused in the liquid, the receptacle is mounted for movement in the vessel between an upper position such that contact between the contents of the receptacle and the liquid is prevented and a lower position in which such contact can take place. Means is provided for holding the receptacle in its upper position until the liquid reaches a predetermined temperature and the receptacle is then released to float on the surface of the liquid. Apertures in the bottom of the receptacle then admit liquid at a controlled rate such as to avoid the production of foam to an unacceptable degree by interaction between the liquid and the material in the receptacle.

6 Claims, 3 Drawing Figures

BEVERAGE MAKER

BACKGROUND TO THE INVENTION

This invention relates to a beverage-making apparatus for infusing a primary constituent, for example tea leaves or coffee grounds, in a liquid secondary constituent, generally water.

When preparing tea or coffee, it is desirable that the tea leaves or coffee ground should not come into contact with the water in which they are to be infused until the temperature of the water has reached the boiling point, or in the case of coffee, possibly some other predetermined value. It is also desirable to avoid the provision of two separate vessels, one for heating the water to its boiling point and the other for infusion. Apparatus having such separate vessels is both more bulky and more expensive to produce than apparatus comprising only a single vessel.

In the specification of U.S. Pat. Application No. 36,895, filed May 13, 1970, and now Pat. No. 3,665,841, there is described a beverage-making apparatus comprising a vessel which is partly filled with the liquid secondary constituent, a receptacle for supporting the primary constituent within the vessel, holding means for releasably supporting the receptacle in an upper position in which the secondary constituent is separated from the primary constituent, and temperature responsive means adapted to effect release of the receptacle from the holder means in response to heating of the temperature responsive means by vapor generated by boiling of the liquid in the vessel, the receptacle then being permitted to fall to a lower position in which the liquid can flow into the receptacle.

Certain forms of primary constituent, when brought into rapid and extensive contact with the boiling secondary constituent, tend to produce a rapidly growing volume of foam. In the constructions described and illustrated in the application aforesaid, the receptacle is provided at its upper end with a lid or cover, formed either as a perforated sheet metal member or as a gauze, and which operates to prevent foam thus generated from emerging into the main body of the vessel and possibly from a pouring spout thereof.

Whilst this form of lid or cover is effective to prevent emergence of foam from the pouring spout of the vessel, the provision of such lid or cover tends to prevent such extensive contact between the primary and secondary constituents as is desirable for efficient beverage-making. Foam formation tends to be most pronounced when the primary and secondary constituents are first brought into contact. Thereafter extensive contact between the constituents could be permitted without excessive foam formation.

SUMMARY OF THE INVENTION

According to the present invention there is provided a beverage-making apparatus for infusing a primary constituent in a liquid secondary constituent and comprising a vessel which, when in use, is partly filled with the liquid, a receptacle for the primary constituent mounted in the vessel for movement between first and second positions in which the primary constituent is respectively maintained out of contact with said liquid and brought into contact with said liquid, heating means for heating said liquid in the vessel, temperature responsive means for controlling movement of the receptacle from its first position towards its second position and operable to permit such movement when the temperature of said liquid reaches a predetermined value, and means for so controlling the rate at which contact is established between said liquid and said primary constituent within the receptacle as to avoid the production of foam to an unacceptable degree.

By unacceptable degree is meant the formation of foam at such a rate as to produce emergence of foam from the spout or other outlet of the vessel.

Preferably said means for controlling the rate at which contact is established between the constituents comprises one or more apertures in the receptacle having a size such as to permit of entry of the liquid at a controlled rate which will avoid foaming to an unacceptable degree, and the first position of the receptacle is an upper position in which the aperture or apertures are above the surface of the surface of the liquid in the vessel, the second position of the receptacle is a lower position within the body of liquid within the vessel, the receptacle is of open-topped form and is so constructed as to float in an intermediate position on the surface of the liquid for a period after release from its upper position with said aperture or apertures below the surface before sinking to the lower position.

This construction permits the primary constituent to become dispersed in the whole body of liquid contained in the vessel during sinking of the receptacle from its intermediate position to its lower position, and during residence of the receptacle in its lower position. Thus, very extensive contact between the primary and secondary constituents can take place at a stage at which danger of foam formation to an unacceptable degree is past.

In many cases the predetermined temperature at which the receptacle is required to be released from its first position is the boiling point of the liquid. When the liquid is at its boiling point, the surface of the liquid may be subject to considerable agitation, which, when the receptacle is of open-topped form can lead to uncontrolled entry of a significant quantity of the liquid into the receptacle through the open top thereof, instead of through the aperture or apertures at a controlled rate.

Accordingly, we prefer to provide on or in association with the receptacle a shield means arranged to prevent or reduce the risk of uncontrolled entry of liquid into the receptacle through the open top thereof whilst the receptacle is floating on the liquid, but so arranged that it does not obstruct the dispersion of the primary constituent into the main body of liquid during and after descent of the receptacle from the surface of the liquid to its lower position.

In a simple and effective arrangement the receptacle comprises a bottom wall and an upstanding side wall, and the shield means comprises an outwardly extending flange at the upper edge of the side wall.

Preferably, there is further provided in association with a pouring spout or other outlet of the vessel, a foam barrier element permeable by the beverage, but capable of disrupting foam to prevent the emergence of foam from the spout or other outlet.

BRIEF DESCRIPTION OF THE DRAWINGS

The invention will now be described by way of example with reference to the accompanying drawings, wherein.

DETAILED DESCRIPTION

Figure 1:
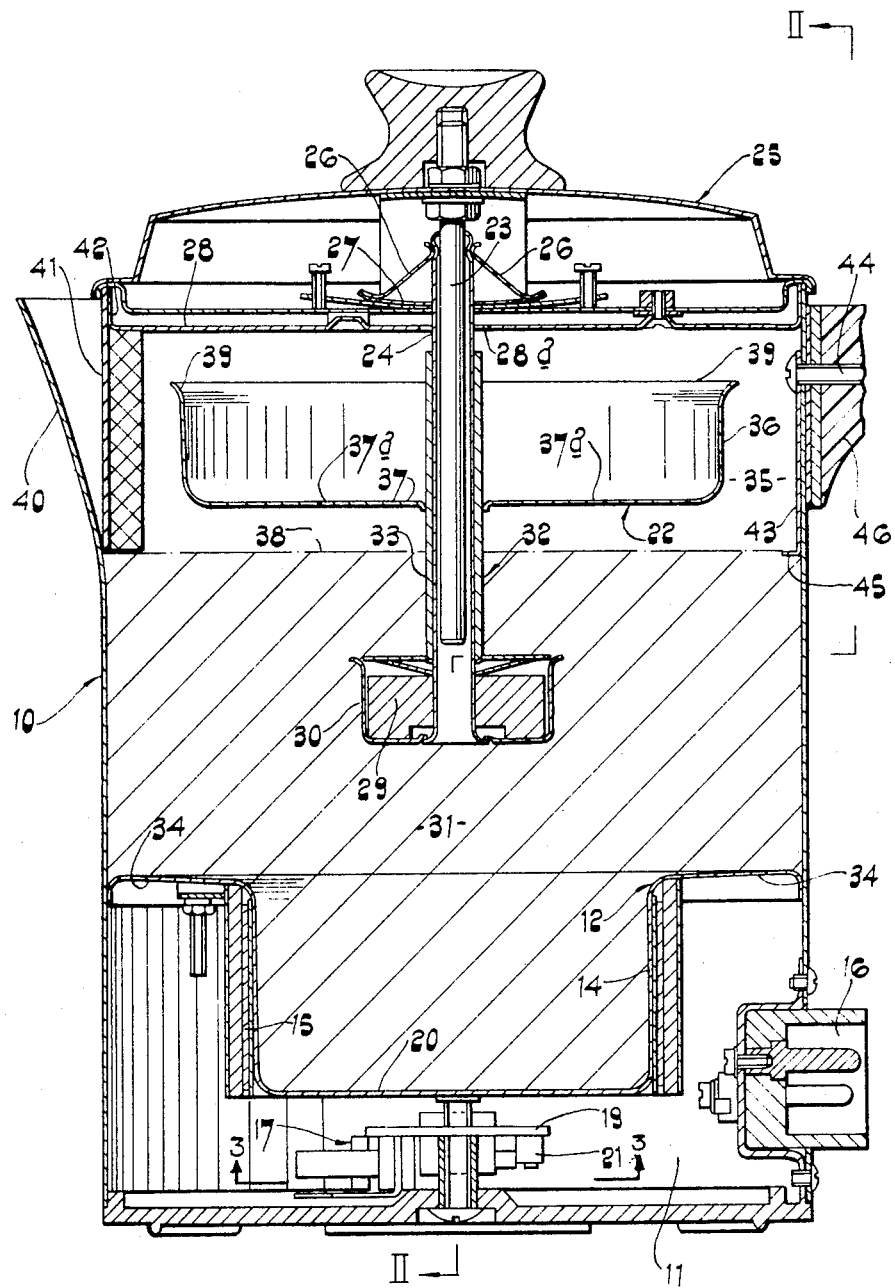
FIG. 1 is a view in side elevation and partly in vertical cross-section of an embodiment of the invention intended primarily for tea-making, the receptacle being shown in its first or upper position.

Generally, the arrangement of the vessel, receptacle, holding means for temporarily holding the receptacle in its first or upper position, and temperature responsive means for controlling release of the receptacle, are as disclosed in the specification of U.S. Pat. Application No. 36,895, filed May 13, 1970, and now U.S. Pat. No. 3,665,841, and therefore only brief reference will be made to the form and function of these parts to enable the features of the present invention to be fully understood.

The apparatus comprises a vessel indicated generally at 10 within which the beverage is prepared. The vessel is conveniently of cylindrical shape and is divided from a lower compartment 11 of the apparatus by a bottom wall 12 incorporating a well.

A side wall portion 14 of the well is surrounded by an electrical heating element 15 to which current can be supplied through an electrical connector 16 accessible from the exterior of the apparatus. Switch contacts 17 positioned within the lower compartment 11 are connected between the heating element 15 and the connector 16 to control energization of the heating element. Control is exercised over the switch contacts 17 by a manually-operable member 18, also accessible from the exterior of the apparatus, and a pair of magnetic elements, one of which is in the form of an armature 19 and the other of which is in the form of a magnet which is referred to in greater detail hereinafter. The armature 19 is disposed below a bottom wall portion 20 of the well and is mounted on one end of a rocker arm 21 for movement between an upper position (shown in FIG. 2) and a lower position (shown in FIG. 1).

The switch contacts 17 can be closed by means of the manually operable member 18, allowing the armature 19 to move to the lower position. When the armature is caused to move to its upper position, as described hereinafter, it causes the switch contacts 17 to open, thereby de-energizing the heating elements 15.

Within the vessel 10 there is a receptacle 22 for the primary constituent of the beverage. The receptacle is mounted for vertical movement between a first or upper position (shown in FIG. 1) and a second or lower position (shown in FIG. 2) on a guide structure comprising a guide bar 23 and a guide tube 24 slidable thereon. The guide bar may be of tubular or solid construction and is supported from the top wall of a hollow lid 25.

Adjacent the upper end of the guide tube 24 there is provided an annular recess for co-operation with holding means disposed in the interior of the lid 25 for releasably holding the guide tube and hence the receptacle 22 in its upper position. The holding means comprises fingers 26 which releasably engage in the annular recess of the guide tube, and which are attached to opposite end portions of a bi-metal strip 27. The bi-metal strip constitutes the temperature responsive means previously referred to and operates, when heated by vapor passing from the interior of the vessel 10 through an aperture 28a in the lower wall 28 of the lid into the interior thereof, to move the fingers 26 apart and so dis-engage them from the guide tube.

The magnet previously mentioned is indicated by the reference numeral 29 and is carried in a housing 30 which is attached to the lower end of the guide tube 24. When the guide tube is engaged with the fingers 26, the magnet occupies an upper position (shown in FIG. 1).

When the fingers 26 are disengaged from the guide tube 24 the latter slides down bar 23 and the magnet 29 moves to a lower position (shown in FIG. 2) in which the housing 30 rests upon the bottom wall portion 20 of the well. When the magnet has moved into this position, the armature 19 is attracted towards the magnet and moves into its upper position, so opening the switch contacts 17. It will thus be evident that when a body 31 of water contained in the vessel reaches its boiling point and generates a sufficient quantity of steam to pass upwardly through aperture 28a to operate the bi-metal strip 27, the magnet is permitted to descent to its lower position and so cause the heating element 15 to be de-energized.

The receptacle 22 is mounted on the guide tube 24 for sliding movement therealong by means of a further tube 32 which is a sliding fit on the outside of the guide tube. A portion 33 of the further tube 32 extends below the receptacle and, in co-operation with the housing 30, acts as a stop means to limit movement of the receptacle downwardly relative to the guide tube. Except when the receptacle is floating, the lower end of the portion 33 of the further tube rests on the housing 30. The length of the portion 33 is such that when the magnet is held in its upper position, the receptacle is maintained out of contact with the body 31 of water, and when the magnet and receptacle occupy their respective lower positions, the receptacle is supported in a position spaced above portions 34 of the bottom wall 12 which extend laterally of the well.

On opening of the switch contacts 17, a significant quantity of heat will be stored in the heating element 15 and in the adjacent parts of the element assembly and side wall portion 14. It is therefore undesirable that the quantity of water in the well be trapped by engagement of the receptacle 22 with the lateral portion 34 of the bottom wall of the vessel. This would not only prevent or obstruct circulation of this volume of water into the upper part of the vessel to mix with the primary constituent, but it may also give rise to periodical lifting movement of the receptacle to relieve steam pressure generated in the well and thereby produce a rattling effect.

The receptacle 22 is conveniently of cylindrical shape and has a diameter which is typically three-quarters of the internal diameter of the vessel 10, leaving an annular space 35 beside the receptacle through which vapor can move upwardly from the surface of the liquid when the latter boils to the lid 25 without significant obstruction arising from the presence of the receptacle.

The receptacle 22 has a side wall 36 and a bottom wall 37. The tube 32 extends through a central aperture in the bottom wall of the receptacle and is joined thereto in any convenient manner to establish a liquid-tight joint. The receptacle is so constructed that, even when containing the maximum quantity of primary constituent, for example tea leaves, which it will ever be required to hold, it will float on the surface 38 of the body 31 of water in the vessel.

In a typical arrangement the degree of buoyancy of the receptacle 22 is such that three-quarters to two-thirds of the height of the side wall 36 will protrude above the surfaces 38 of the water, while the bottom wall 37 will be beneath the surface.

It will be appreciated that when the fingers 26 release the guide tube 24 and the magnet 29 descends immediately to its lower position, the receptacle 22 will descend immediately to the surface 38 of the water, where it will float for a period. In order to infuse the primary constituent within the receptacle in the water, it is necessary to bring these two constituents into contact. However, in order to avoid the formation of foam to such a degree that foam is likely to be expelled from the vessel 10, means is provided for permitting contact between the water and the primary constituent at a controlled rate. Such means comprises one or more small apertures 37a in the bottom wall 37 of the receptacle. When the receptacle is floating upon the surface 38, water passes through the aperture or apertures in the bottom wall 37 and causes the receptacle to sink gradually towards its lower position.

The area of the aperture in the bottom wall 37, or the aggregate area of the apertures 37a where several are provided, is such as to permit water to flow into the receptacle 22 at a lower rate than that which will produce a significant quantity of foam. In the embodiment now described, good results have been obtained using eight holes 37a of 0.055 inches diameter in the bottom wall 37 of the receptacle. This provides a total aperture area of 0.02 square inches.

In practice we have found that foaming to an unacceptable degree is avoided if the receptacle floats on the water (with water entering the receptacle through the apertures) for at least 15 seconds. It is preferred that the floating time be at least 30 seconds to ensure that foaming will not exceed the acceptable level even if conditions tend to promote foaming, for example if tea leaves having a high dust content is used and/or if the water is boiled very vigorously or continues to boil for a significant period after switching off the electrical heating element due to stored heat. These time periods are believed to constitute reliable criteria to determine the aperture area for different sizes and weights of receptacle.

It will be noted that the radial dimension of the space 35 at either side of the receptacle 22 is comparatively small, being approximately one-eighth the diameter of the vessel 10, so that even if the surface 38 of the water is considerably agitated, as will be the case when the water is boiling, the likelihood of water being projected upwardly and entering the receptacle by way of its open upper end is small. This risk is still further reduced by the provision of a shield means comprising a laterally outwardly projecting flange 39 at the upper end of the side wall 36. As seen in the drawings, this flange is of arcuate form in cross-section and curves both upwardly and outwardly. However, the flange could be flat and horizontal if desired.

The absence of a top wall or cover from the receptacle 22 permits unobstructed contact between the constituents of the beverage when the receptacle sinks below the surface 38 of the water. It will be apparent that the primary constituent can pass out of the receptacle and be dispersed throughout the body 31 of water. Such dispersion will be assisted by convection currents which exist in the body of water at least for a short period after the switch contacts 17 open whilst the heat stored in the heating element 15 and adjacent parts is transferred to the water.

The tube 32 which is attached to the receptacle 22 extends upwardly to a height above the bottom wall 37 of the receptacle which is at least equal to the height of the side wall 36, and preferably, as shown in the drawings, greater than the height of the side wall. This prevents water passing upwardly through the clearance space between the tube 32 and the guide tube 24 into the receptacle. If water were permitted to enter the receptacle in this manner, the rate of entry of water would not be controlled by the apertures formed in the bottom wall 37.

Since primary constituents such as tea vary widely as to their particle size, and hence as to the proportion of fine particles which are most prone to produce foaming, a further means is provided to reduce or avoid the risk of emergence of foam from the pouring spout 40 of the vessel. This further means comprises a foam barrier element 41 which extends across the entrance to the pouring spout. The foam barrier element is conveniently formed of a gauze having a mesh size sufficiently fine to disrupt or break up foam. The gauze is in the form of an arcuate dependent plate secured to the outer surface of a peripheral flange 42 of the lower wall 28 of the lid. Alternatively, the barrier element could be secured to a depending flange which is formed at the periphery of the top wall of the lid. The lower margin of the barrier element 41 conforms in shape to the interior surface of the vessel 10 and is in contact therewith so that liquid cannot be poured from the spout 40 without passing through the barrier element.

Figure 2:
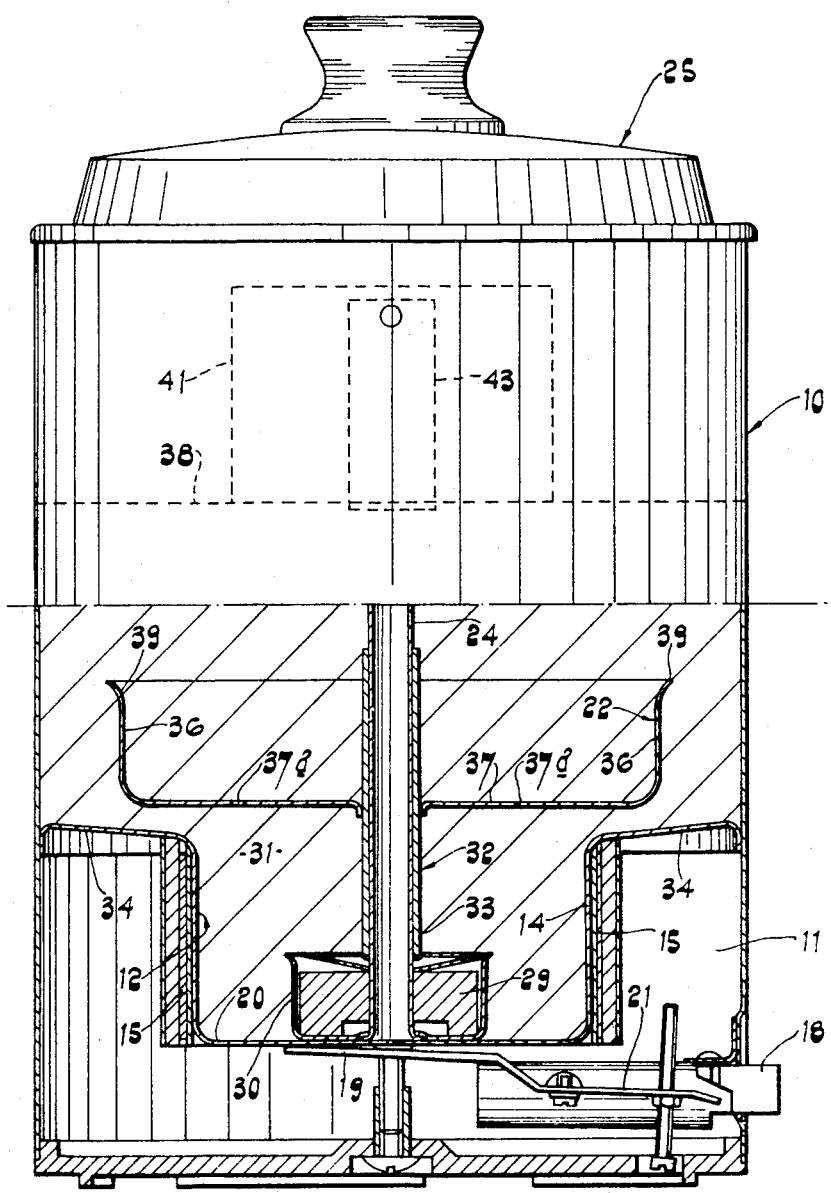
FIG. 2 is a view of the same embodiment partly in vertical cross-section of the line II — II of FIG. 1, the receptacle being shown in its second or lower position.
Figure 3:
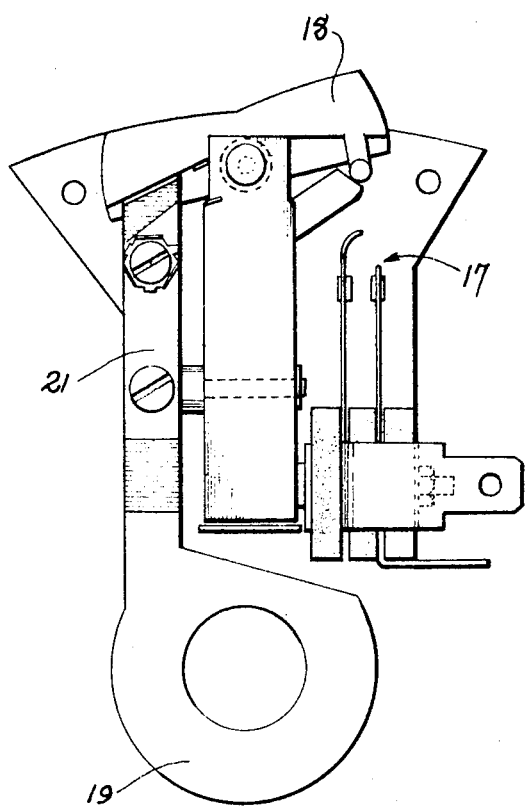
FIG. 3 is a fragmentary sectional view on the line III — III of FIG. 1, showing the switch means.

A maximum liquid level indicator plate 43 is attached to the side of the vessel 10 opposite the pouring spout 40 by a screw 44. A lower marginal portion 45 of the indicator plate is bent inwardly of the vessel to enable the level of the surface 38 of the water in the vessel to be compared readily with the indicated maximum level. A handle 46, only a part of which is shown in FIG. 1, is also attached to the vessel by the screw 44.

It will be evident that the magnet 29 and armature 19 could be interchanged, and that the armature could be replaced by a further magnet. It will also be appreciated that the bottom wall 12 is formed of a non-magnetic material such as a stainless steel.

Instead of forming the holes 37a in the bottom wall of the receptacle, they could be formed in the side wall at a position which will be below the surface of the water when the receptacle first floates thereon. This reduces any tendency to spillage of the primary constituent when loading.

We claim:

1. In a beverage making apparatus for infusing a primary constituent in a liquid secondary constituent, such apparatus comprising a vessel which, when in use, is partly filled with the liquid, a receptacle for the primary constituent mounted in the vessel for movement between an upper position and a lower position in which the primary constituent is respectively maintained out of contact with said liquid and brought into contact with said liquid, holding means for releasably holding the receptacle in said upper position, and heating means for heating said liquid, the improvement wherein;

a. there is provided switch means for controlling energization of said heating means,
b. there is provided a pair of magnetic elements, such pair including at least one magnet,
c. means is provided on said holding means for holding one of said pair of magnetic elements in association with the receptacle when the two are in an upper position, and means mounting said one magnetic element for vertical movement relative to the receptacle so as to be free to descend immediately to a lower position when released from the holding means while the receptacle sinks gradually into the liquid,
d. means operatively connecting the other of said pair of magnetic elements with the switch means for operating same in response to movement of said one element to its lower position,
e. temperature responsive means is provided for controlling movement of the receptacle and said one of said pair of magnetic elements from their respective upper positions towards their lower positions and operable to permit such movement when the temperature of said liquid reaches a predetermined value,
f. the receptacle comprises means for floating itself on said liquid within the vessel for a predetermined period of time when the receptacle is released from its upper position,
g. at least one aperture is formed in the receptacle at a position which is below the level of the surface of said liquid when the receptacle floats thereon,
h. means defining said aperture formed in the receptacle is provided for controlling the rate at which contact is established between said liquid and said primary constituent within the receptacle, for avoiding the production of foam to an unacceptable degree.

2. The improvement according to claim 1 wherein:
a. the vessel has a bottom wall portion formed of non-magnetic material,
b. said other of the pair of magnetic elements is disposed below said bottom wall portion,
c. said one of the pair of magnetic elements is provided with co-operating means releasable engagement with said holding means to hold said one of the magnetic elements in its upper position, and
d. stop means is provided for so limiting movement of the receptacle downwardly relative to said one of the magnetic elements that when said co-operating means is engaged with said holding means, the receptacle is supported in its upper position.

3. In a beverage making apparatus for infusing a primary constituent in a liquid secondary constituent, such apparatus comprising a vessel which, when in use, is partly filled with the liquid, a receptacle for the primary constituent mounted in the vessel for movement between an upper and a lower position in which the primary constituent is respectively maintained out of contact with said liquid and brought into contact with said liquid, holding means for releasably holding the receptacle in the upper position, and heating means for heating said liquid, the improvement wherein;

a. temperature responsive means is provided for controlling movement of the receptacle from its upper position towards its lower position and operable to permit such movement when the temperature of said liquid reaches a predetermined value,
b. the receptacle is of open topped form,
c. the receptacle comprises means for floating itself on said liquid within the vessel for a predetermined period of time when the receptacle is released from its upper position,
d. the receptacle further comprises means for admitting said liquid when the receptacle is floating, and for causing the receptacle to sink to its lower position,
e. and the receptacle further comprises means for restricting the admission of said liquid to a rate which permits the receptacle to float for a period of at least fifteen seconds before sinking to its lower position.

4. The improvement according to claim 3 wherein said means for restricting the admission of liquid comprises a wall of the receptacle, in which wall are formed aperture means constituting said means for admitting liquid, and said aperture means have a total area of approximately 0.02 sq. inches.

5. The improvement according to claim 3 wherein the receptacle has a bottom wall and an upstanding side wall, and said means for admitting said liquid when the receptacle is floating thereon consists of aperture means formed in the bottom wall only.

6. In a beverage making apparatus for infusing a primary constituent in a liquid secondary constituent, such apparatus comprising a vessel which, when in use, is partly filled with the liquid, a receptacle for the primary constituent mounted in the vessel for movement between an upper and a lower position in which the primary constituent is respectively maintained out of contact with said liquid and brought into contact with said liquid, holding means for releasably holding the receptacle in said upper position, and heating means for heating said liquid, the improvement wherein:

a. temperature responsive means is operatively associated with said holding means for effecting release of the receptacle from the holding means when the temperature of said liquid reaches a predetermined value,
b. the receptacle is of open topped form,
c. the receptacle comprises means for floating itself on said liquid within the vessel for a predetermined period of time when the receptacle is released from its upper position,
d. the receptacle comprises a bottom wall and a side wall upstanding therefrom, e. the receptacle further comprises means projecting laterally outwardly from an upper end of said side wall for obstructing uncontrolled entry of liquid into the receptacle through the open top thereof whilst the receptacle is floating on said liquid.

* * * * *